UNITED STATES PATENT OFFICE.

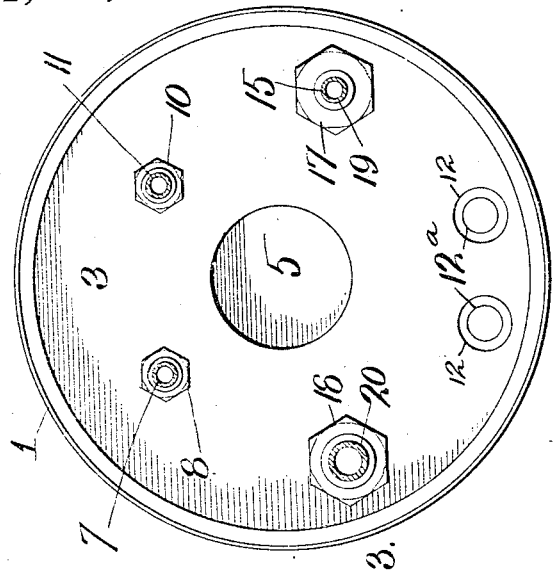
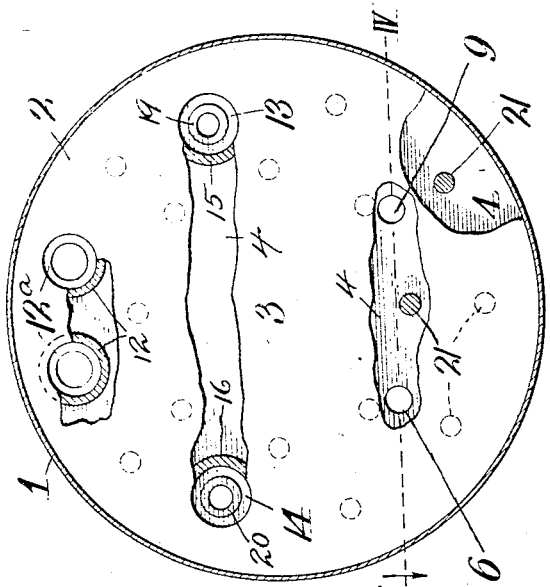
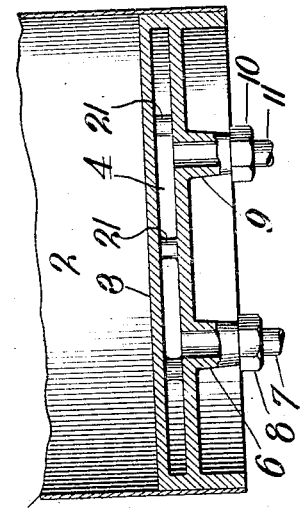
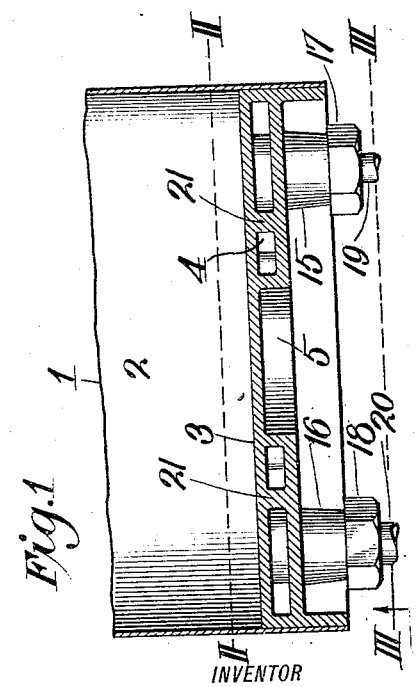

HENRY D. KELLY, OF KANSAS CITY, MISSOURI.

COFFEE-URN.

1,285,732.

Specification of Letters Patent.

Patented Nov. 26, 1918.

Application filed March 8, 1915. Serial No. 12,835.

*To all whom it may concern:*

Be it known that I, HENRY D. KELLY, a citizen of the United States, residing at Kansas City, in the county of Jackson and State of Missouri, have invented certain new and useful Improvements in Coffee-Urns, of which the following is a specification.

This invention relates to coffee urns of that class in which a pipe conducts water from a point near the bottom of the urn to a point over the ground coffee receptacle into which such water is discharged to extract the beverage producing properties from the ground coffee, and my object is to produce a construction for the bottom of the urn whereby boiling of the entire body of water therein can be quickly effected, and which will render satisfactory service for a long period of time and thereby avoid the necessity of dismantling the urn to permit the interior thereof to be scraped or otherwise cleared.

Heretofore urns have largely been provided with steam coils whereby to heat the water to the boiling point preliminary to conduction to the ground coffee receptacle, and it has been found that the attendants in their hurry to prepare coffee for serving almost universally open the valve to effect the transfer of water from the lower part of the water chamber of the urn to the ground coffee receptacle as soon as they note that steam is issuing from the relief valve of the urn. In such cases the coffee prepared is usually of inferior quality due to the fact that with urns of the type mentioned—particularly after a short period of service,—the water at the bottom of the boiler has not attained the boiling point at the time removed. The coffee produced is not only of an inferior quality but a percentage of the beverage producing property of the coffee has been wasted, because it has been found that it is impossible to make perfect coffee without using water that has at least attained boiling temperature.

Another objection to the steam coil method of heating water in force, is that the use of unions or couplings necessitate the spacing of the coil in the urn, at least an inch or more above the bottom thereof, which of course means heating of the water in the plane of and above the coil to the boiling temperature before the water below is raised to said temperature. It is also well known that coils will become incrusted with scale to such thickness as to seriously impair their heat radiating properties. In fact this is so objectionable that occasionally the coils must be chiseled to remove the scale and in this removal the coils are frequently broken.

I have also found that by applying steam directly to the bottom of the urn, the entire body of water can be raised to a boiling temperature very quickly and that under such application of steam the bottom of the urn remains free of scale and sediment and that consequently a direct application of heat to the water is accomplished, the fact that no scale accumulates on the bottom under such application of steam permitting the boiler to be used for an indefinite period of time without dismantling for cleaning or scale removing purposes, as the accumulation of scale on the interior of the water chamber above the bottom does not retard the progress of boiling the water.

My particular object therefore is to produce a boiler having a steam generating chamber in its bottom, a further object being to provide the bottom with an opening to permit of the heating of the boiler by applying flame from a gas burner directly thereto in the event that a supply of steam to the chamber is not available or in the event that the steam is under a pressure too low to supply the necessary amount of heat to boil the water quickly.

With the objects named in view the invention consists in certain novel and useful features of construction and organization as hereinafter described and claimed, and in order that it may be fully understood reference is to be had to the accompanying drawings, in which—

Figure 1, is a vertical section of the lower end of a coffee urn embodying my invention.

Fig. 2, is a section on the line II—II of Fig. 1.

Fig. 3, is a section on the line III—III of Fig. 1.

Fig. 4, is a section on the line IV—IV of Fig. 2.

In the said drawing, 1 indicates the shell of the urn, and 2 the water chamber. The bottom 3 of the shell is preferably bronze to avoid corrosion, and is cast with a shallow steam chamber 4 of circular form, and a downwardly-opening circular recess 5 provided it is desired to produce an urn susceptible of being heated by gas or both gas and steam.

A tubular boss 6 communicates with the steam chamber. It depends from the bottom and for convenience is connected to a steam supply pipe 7, by a union 8 or its equivalent. A similar boss 9 also depends from the bottom and is connected by a union 10 or the like, to a pipe 11, leading to any desired receptacle.

The bottom is provided with through openings 12, for the accommodation of ventilating pipes 12ª commonly employed in modern coffee urns, and with through openings 13 and 14, which also extend through bosses 15 and 16 connected by unions 17 and 18 respectively, to the upper ends of a water supply pipe 19 and a waste water pipe 20. The bosses 6 and 9 and pipes 19 and 20 have the usual controlling valves, not shown.

The bottom and top of the hollow bottom are connected at intervals by bridges 21, whereby to stiffen and strengthen it without appreciably diminishing the steam capacity or direct heat applying quality of the bottom.

In the operation of an urn provided with a bottom of the construction described, the steam supplied to the chamber quickly raises the entire body of water to boiling temperature, and if the steam is obtained from the ordinary steam service pipes of the building, which usually carry steam at such a low pressure that a relatively long period of time would lapse before the water could be raised to boiling temperature, a gas burner (not shown), may be arranged under the recess 5, and the flame produced therefrom may play directly on the bottom and aid in raising the water to the boiling point.

For quick order service restaurants an urn provided with a bottom of the type described is very desirable and this is especially true in sections of the country where the water is heavily impregnated with alkali and other scale forming constituents.

From the above description it will be apparent that I have produced an urn having a bottom possessing the features of advantage enumerated as desirable, and while I have illustrated and described the preferred embodiment thereof, I reserve the right to make all changes falling within the spirit and scope of the appended claim.

I claim:

A boiler provided with a bottom having a recess in its under side and a shallow chamber surrounding but not communicating with said recess, and also having two pairs of through openings not in communication with said shallow chamber, and a pair of tubular bosses communicating with the shallow chamber through the bottom thereof; a pair of pipes respectively communicating with the said bosses, a pair of pipes respectively communicating with one pair of said through openings, and a pair of ventilating pipes extending through the other pair of through openings.

In testimony whereof, I affix my signature, in the presence of two witnesses.

HENRY D. KELLY.

Witnesses:
  H. C. RODGER,
  G. Y. THORPE.

Copies of this patent may be obtained for five cents each, by addressing the "Commissioner of Patents, Washington, D. C."